(12) United States Patent
Gargiulo et al.

(10) Patent No.: US 7,747,757 B2
(45) Date of Patent: Jun. 29, 2010

(54) DISTRIBUTED NETWORK QUERY

(75) Inventors: John L. Gargiulo, Floral Park, NY (US); Paul Gassoway, Levittown, NY (US); Lingling Liu, Commack, NY (US)

(73) Assignee: Computer Associates Think, Inc., Islandia, NY (US)

( * ) Notice: Subject to any disclaimer, the term of this patent is extended or adjusted under 35 U.S.C. 154(b) by 1307 days.

(21) Appl. No.: 09/944,292

(22) Filed: Aug. 31, 2001

(65) Prior Publication Data

US 2002/0062381 A1    May 23, 2002

Related U.S. Application Data

(60) Provisional application No. 60/249,479, filed on Nov. 17, 2000.

(51) Int. Cl.
*G06F 15/16* (2006.01)
*G06F 15/173* (2006.01)

(52) U.S. Cl. .................. 709/228; 709/218; 709/238

(58) Field of Classification Search .............. 709/218, 709/228, 238
See application file for complete search history.

(56) References Cited

U.S. PATENT DOCUMENTS

| | | | | |
|---|---|---|---|---|
| 5,253,252 A * | 10/1993 | Tobol | .......... | 370/452 |
| 5,317,742 A * | 5/1994 | Bapat | .......... | 707/3 |
| 5,471,461 A * | 11/1995 | Engdahl et al. | .......... | 370/252 |
| 5,493,722 A * | 2/1996 | Gunn et al. | .......... | 455/517 |
| 5,604,868 A * | 2/1997 | Komine et al. | .......... | 709/238 |
| 5,987,011 A * | 11/1999 | Toh | .......... | 370/331 |
| 6,104,701 A * | 8/2000 | Avargues et al. | .......... | 370/238 |
| 6,112,247 A * | 8/2000 | Williams | .......... | 709/236 |
| 6,192,404 B1 * | 2/2001 | Hurst et al. | .......... | 709/224 |
| 6,574,197 B1 * | 6/2003 | Kanamaru et al. | .......... | 370/252 |
| 6,636,887 B1 * | 10/2003 | Augeri | .......... | 709/203 |
| 6,725,263 B1 * | 4/2004 | Torres | .......... | 709/223 |
| 6,791,981 B1 * | 9/2004 | Novaes | .......... | 370/390 |
| 6,804,240 B1 * | 10/2004 | Shirakawa et al. | .......... | 370/392 |

* cited by examiner

*Primary Examiner*—Ramy M Osman
*Assistant Examiner*—Avi Gold
(74) *Attorney, Agent, or Firm*—Baker Botts L.L.P.

(57) ABSTRACT

A method of identifying a plurality of nodes on a network, includes receiving at at least one of the plurality of nodes on the network a query posed by a caller node determining at the at least one of the plurality of nodes on the network an answer to the query, forwarding the answer to the query from the at least one of the plurality of nodes on the network to the caller node and receiving, at the caller node, the answer to the query from the at least one of the plurality of nodes on the network and maintaining a list of nodes which responded to the query.

50 Claims, 11 Drawing Sheets

DISTRIBUTED NETWORK QUERY

RELATED CASES

The present disclosure is based on and claims the benefit of Provisional Application Ser. No. 60/249,479 filed Nov. 17, 2000 and entitled Distributed Network Query.

TECHNICAL FIELD

The present disclosure relates to a system and method of identifying a plurality of nodes in a network. In particular, the present disclosure relates to a system and method that performs a distributed network query for identifying nodes on a network.

DESCRIPTION OF RELATED ART

Many computer network application softwares need information regarding the nodes that are on the network. Such information may be accumulated on a single machine or server. In such a system, each machine or node on the network sends out automatically at predetermined intervals (e.g., each hour) packets which identify the node. These packets are referred to as "heartbeat" packets. When there are many nodes on the network, the number of "heartbeat" packets invariably cause large amounts of network traffic.

Network browsers allow users to view a list of network resources, e.g., domains (for example, nominal partitions of the network at large), servers and other computers, that are available from the user's machine. For example, Microsoft network browser technology, which is described in detail at http://msdn.microsoft.com/library/winresource/dnwinnt/S75A8.HTM, includes machines on a local subnet (e.g., a physical, logical or virtual subdivision of the network) that send heartbeat packets, typically every 12 minutes. A data collector machine continuously collects the heartbeat packets and maintains a list of the nodes on the subnet based on the collected information. The data collector machine may provide information regarding the computers on the local subnet to machines on another subnet.

SUMMARY

A method and system of identifying a plurality of nodes on a network comprises receiving at least one of the plurality of nodes on the network a query posed by a caller node, determining at the at least one of the plurality of nodes on the network an answer to the query, forwarding the answer to the query from the at least one of the plurality of nodes on the network to the caller node and receiving, at the caller node, the answer to the query from the at least one of the plurality of nodes on the network and maintaining a list of nodes which responded to the query.

According to another aspect of the present disclosure, a system and method of identifying nodes on a network comprises sending a query from a caller node to a subnet, receiving the query at each of a plurality of nodes on the subnet, sending from each of the plurality of nodes on the subnet a local response to the query to at least one other node on the subnet, receiving, at one of the plurality of nodes on the subnet, the local responses and compiling a list identifying responding nodes and sending the list of responding nodes to the caller node.

According to another aspect of the present disclosure, a system and method of controlling a node in a network comprises receiving at the node a query from a caller node, determining an answer to the query, calculating a period of time to wait before responding to the query, and determining whether the node has a lowest address in the network. If the node does not have the lowest address in the network, the period of time is waited and then the query is respond to. If the node does have the lowest address in the network, an address of a node having a highest address in the network is determined. Based on the highest address in the network, a query timeout period is determined. If the node does have the lowest address in the network, listening for responses to the query from other nodes in the network and preparing a list of responding nodes and transferring the list of responding nodes to the caller node.

According to another aspect of the present disclosure, a network, comprises a server for posing a query to a plurality of client nodes on the network and a plurality of client nodes for receiving the query posed by a caller node and for determining an answer to the query, each of the plurality of client nodes forwarding the answer to the query to the caller node, wherein the server receives the answers to the query from the plurality of client nodes and maintains a list of client nodes which responded to the query.

According to another aspect of the present disclosure, a node for use on a subnet, comprises a section for receiving a query from a caller node, a section for determining an answer to the query, a section for calculating a period of time to wait before responding to the query, and a section for determining whether the node has a lowest address in the network, wherein if the node does not have the lowest address in the network, waiting the period of time and then responding to the query, and wherein if the node does have the lowest address in the network, a section of the node determines an address of a node having a highest address in the network and based on the highest address in the network, determines a query timeout period and wherein if the node does have the lowest address in the network, a section listens for responses to the query from other nodes in the network and prepares a list of responding nodes. A section is provided for transferring the list of responding nodes to the caller node.

In some embodiments, a network device may comprise a receiving query section for receiving a query sent by a caller node to a plurality of nodes on a network. The network device may further comprise a list processing section for monitoring responses from other nodes to the query and maintaining a list of nodes which responded to the query.

According to another aspect of the present disclosure, a computer readable medium having computer executable code for identifying nodes on a network, comprises server code for posing a query to a plurality of client nodes on the network and client code for use by a plurality of client nodes for receiving the query posed by a caller node and for determining an answer to the query, the client code including code instructing each of the plurality of client nodes to forward the answer to the query to the caller node, wherein when a node running the server code receives the answers to the query from the plurality of client nodes a node running the server code maintains a list of client nodes which responded to the query.

According to another aspect of the present disclosure, a program storage device readable by a machine, tangibly embodying a program of instructions executable by the machine to identify a plurality of nodes on a network, comprises instructions to receive at least one of the plurality of nodes on the network a query posed by a caller node. The program storage device further comprises instructions to monitor, at a responder node which received the query, responses from other nodes to the query and maintain a list of nodes which responded to the query.

According to another aspect of the present disclosure, a computer data signal embodied in a transmission medium comprises (1) a first segment including receive query code to receive a query sent by a caller node to a plurality of nodes on a network, and (2) a second segment including list processing code to monitor responses from other nodes to the query and maintain a list of nodes which responded to the query.

BRIEF DESCRIPTION OF THE DRAWINGS

The features of the present disclosure and many of the advantages thereof can be more readily understood from the following detailed description when considered with reference to the accompanying drawings wherein.

DETAILED DESCRIPTION

Figure 1:
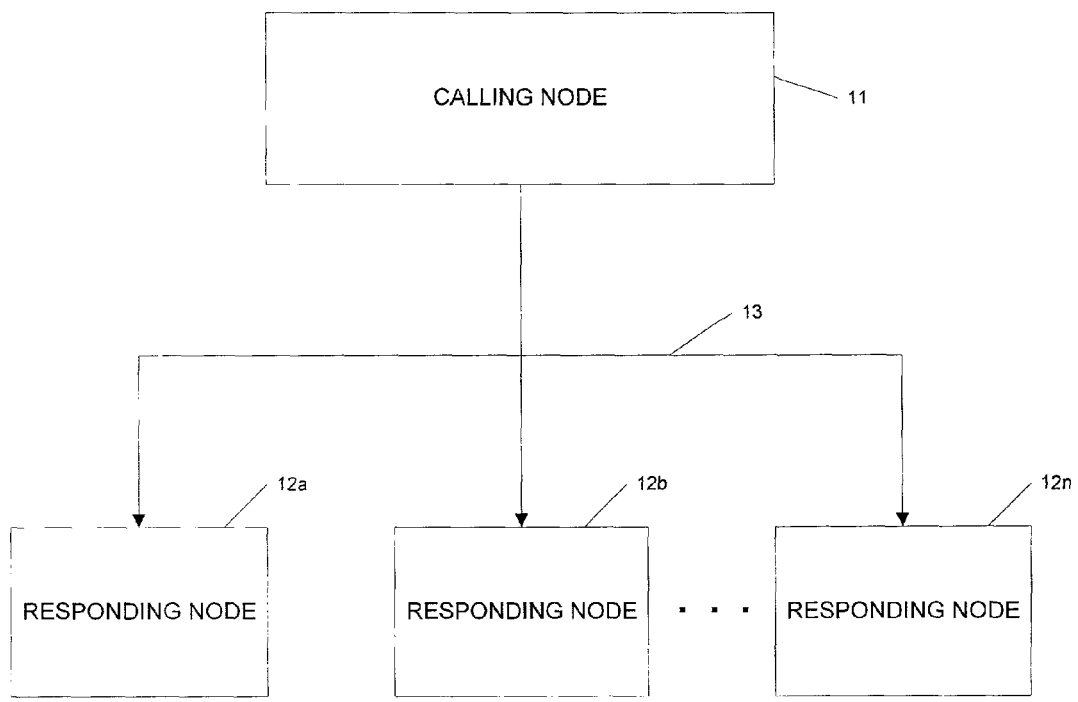
FIG. 1 is a block diagram of an exemplary network system, in accordance with an embodiment of the present disclosure.

In describing embodiments of the present disclosure illustrated in the drawings, specific terminology is employed for sake of clarity. However, the present disclosure is not intended to be limited to the specific terminology so selected and it is to be understood that each specific element includes all technical equivalents which operate in a similar manner.

The present disclosure provides systems and methods for identifying nodes on a network. According to an embodiment of the present disclosure, a query can be posed to machines (nodes) on a network. The node posing the query (or another node) can listen for responses to the query from the other nodes and form a list of responding nodes. In this way, information about the nodes on the network and information about the network itself can be obtained at a low network overhead. For example, a calling node may pose a question, such as "which computers on the network are running a program X?" or "which computers are running in the subnet?", to other nodes on the network. The answer is returned by the other nodes to, for example, the calling node, after the question is posed. The answers to the query may be used to identify nodes on the network without requiring the nodes to send heartbeat packets repeatedly. Therefore, the nodes do not continuously generate needless network traffic.

Figure 2:
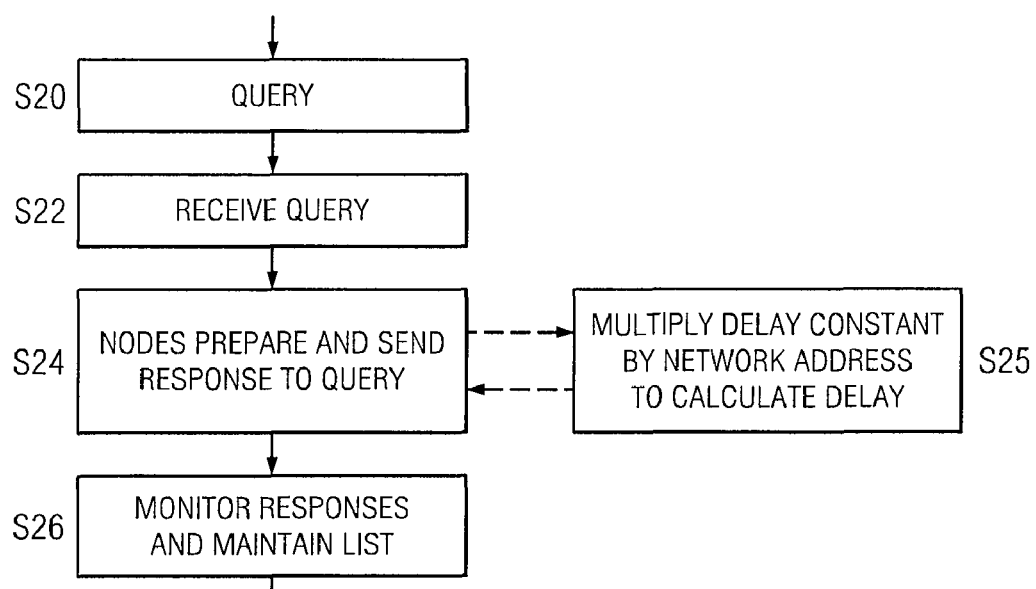
FIG. 2 is a flow chart of a method of identifying a plurality of nodes on a network, in accordance with an embodiment of the present disclosure.

A network system, in accordance with one embodiment shown in FIG. 1, includes a calling node 11, a plurality of responding nodes 12a-12n, and network 13 connecting the calling node 11 and responding nodes 12a-12n. A method of identifying nodes on network 13, in accordance with one embodiment of the present disclosure, will be described with reference to FIGS. 1 and 2.

A query is sent by calling node 11 (Step S20) and is received by at least one of the plurality of other nodes on the network 13 (e.g., responding nodes 12a-12n) (Step S22). One or more of responding nodes 12a-12n determine an answer to the query and send a response back to node 11 (Step S24). The response may include information identifying the responding node, as well as the answer to the query. Calling node 11 monitors responses from the responding nodes and maintains a list of nodes which responded to the query (Step S26). Based on the responses, node 11 can determine which nodes are on the network 13.

The responding nodes may include capabilities for determining response delay times. The response delay times allow the responses from the nodes to be staggered, thus preventing a possible flood of network traffic. For example, each responding node may be capable of multiplying a predetermined delay constant by its network address (or a portion thereof) to calculate a delay to wait before sending its response back to node 11 (Step S25). The predetermined delay constant can be preset for each node. The delay constant may be included with the query from calling node 11. This allows node 11 to customize the response times from the responding nodes based, for example, on projected network traffic, etc. The delay time calculations will be described in more detail later below.

Figure 3:
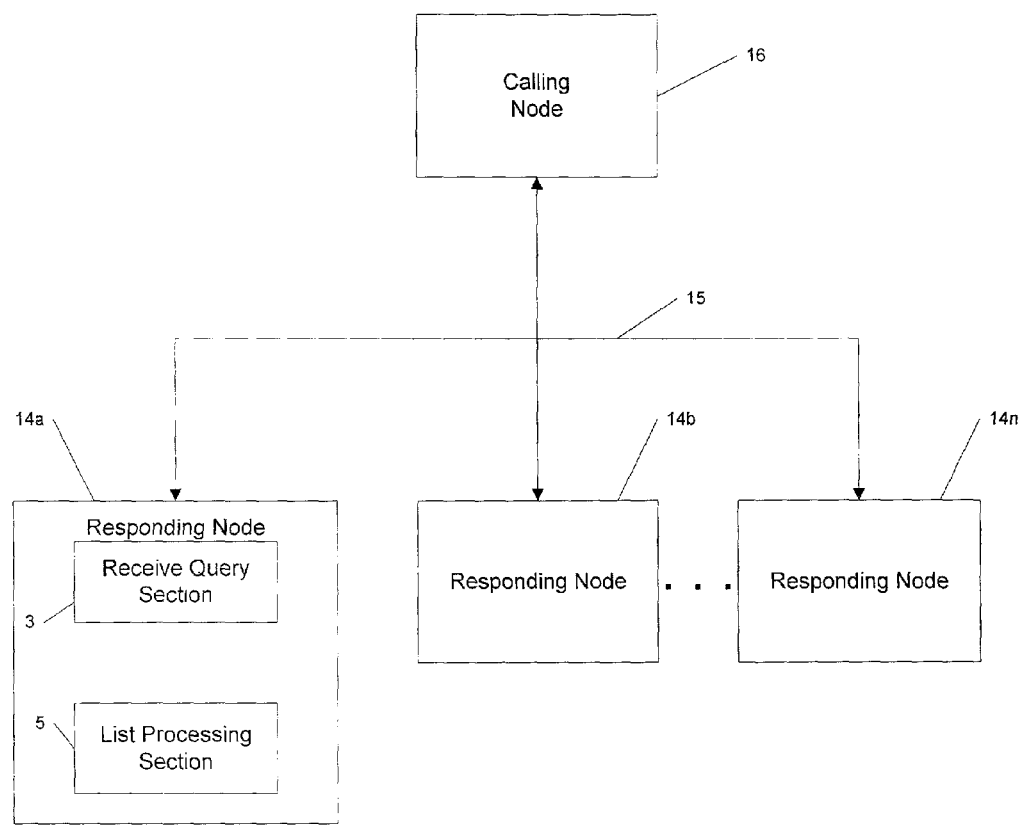
FIG. 3 is a block diagram of an exemplary network system, in accordance with another embodiment of the present disclosure.
Figure 4:
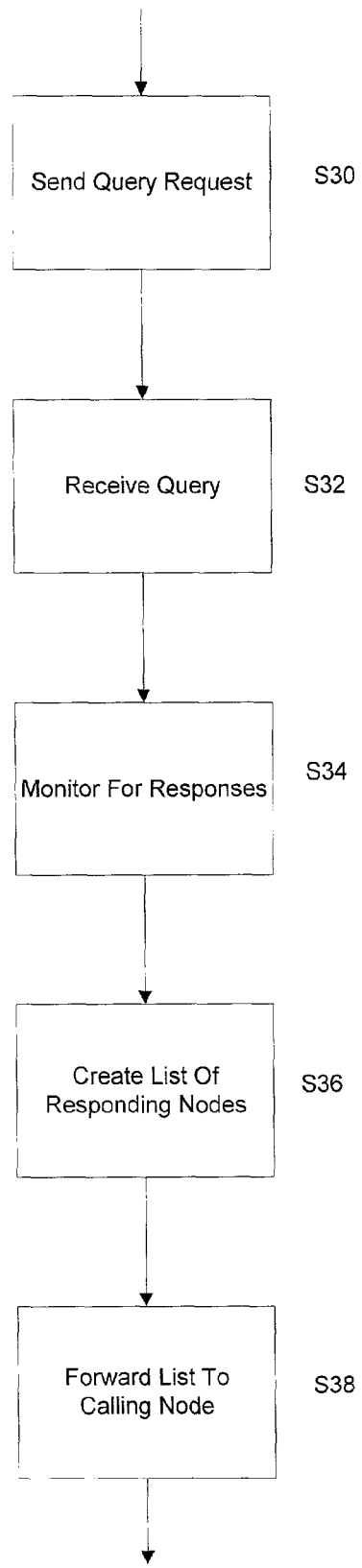
FIG. 4 is a flow chart of a method of identifying a plurality of nodes on a network, in accordance with another embodiment of the present disclosure.

According to another embodiment as shown in FIGS. 3 and 4, a calling node can send a query to the nodes on the network and request a particular node to act as a monitoring node. For example, calling node 16 sends a query request (Step S30) to responding nodes 14a-14n on network 15, requesting node 14a to monitor for responses from the other nodes (e.g., nodes 14b-14n) and to maintain a list of nodes which responded to the query. Node 14a receives the query request (Step S32) in a receive query section 3, monitors for responses from other responding nodes (e.g., nodes 14b-14n) (Step S34) and creates a list of responding nodes (Step S36) in a list processing section 5. Node 14a may then forward the list of responding nodes to calling node 16 (Step S38). The list may include answers from each of the nodes (including node 14a) to the query posed, and/or information identifying the nodes on the network.

The methods and systems of the present disclosure may be implemented in a network environment which includes one or more subnets having nodes to be queried, as will be further described below.

A method and system according to an embodiment of the present disclosure performs a distributed query using software including, for example, a Distributed Query Server (DQS) and a Distributed Query Client (DQC) to communicate between a server and a number of clients.

The DQS runs on a node, referred to herein as a DQS node. The DQS node may pose queries to other nodes on the network. The DQC runs on one or more nodes on the network, each referred to herein as a DQC node. Each DQC node is capable of responding to a query from the DQS node. A node could have both a DQS and a DQC, which can be running at the same time. The DQC and/or DQS running on a node may be, for example, a part of (e.g., a plug-in to) the operating system for the node.

Figure 5:
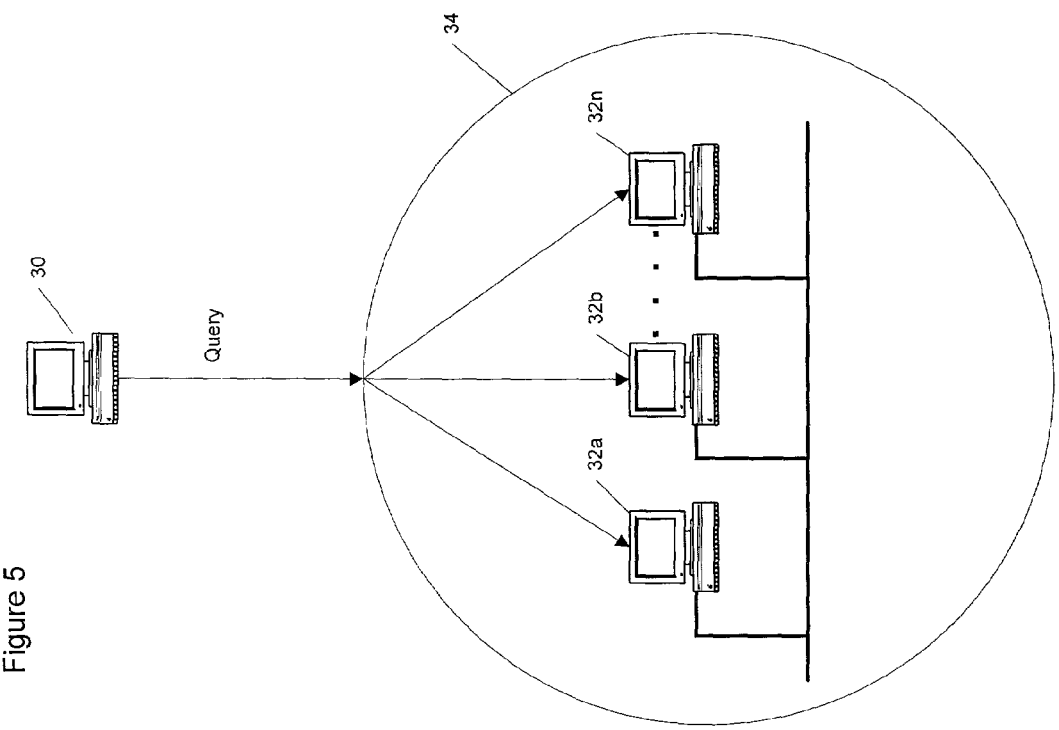

For example, according to an embodiment as shown in FIG. 5, DQS node 30 may pose a query to one or more nodes on a network, including client nodes 32a-32n on subnet 34. In this embodiment, each of client nodes 32a-32n is a DQC node and each is capable of responding to the query from the DQS node 30.

When the query is to be submitted to a subnet as in this embodiment, the subnet may be identified by DQS node 30 by specifying an address in the subnet 34 along with the subnet mask in the query. This allows the DQS node 30 to send a single query to the nodes (32a-32n) in the subnet 34. For example, DQS 30 can send the query along with the subnet mask to an appropriate router (not shown) in subnet 34. The router can then distribute the query to the host addresses (DQC nodes) within the subnet 34.

In an IP (Internet Protocol) environment, the query may be submitted by the DQS node 30 to the subnet 34 in a number of ways, such as (a) using an IP directed broadcast (e.g., to all addresses in the subnet) to the subnet or (b) using IP multicasting (e.g., to specified addresses).

Figure 6:
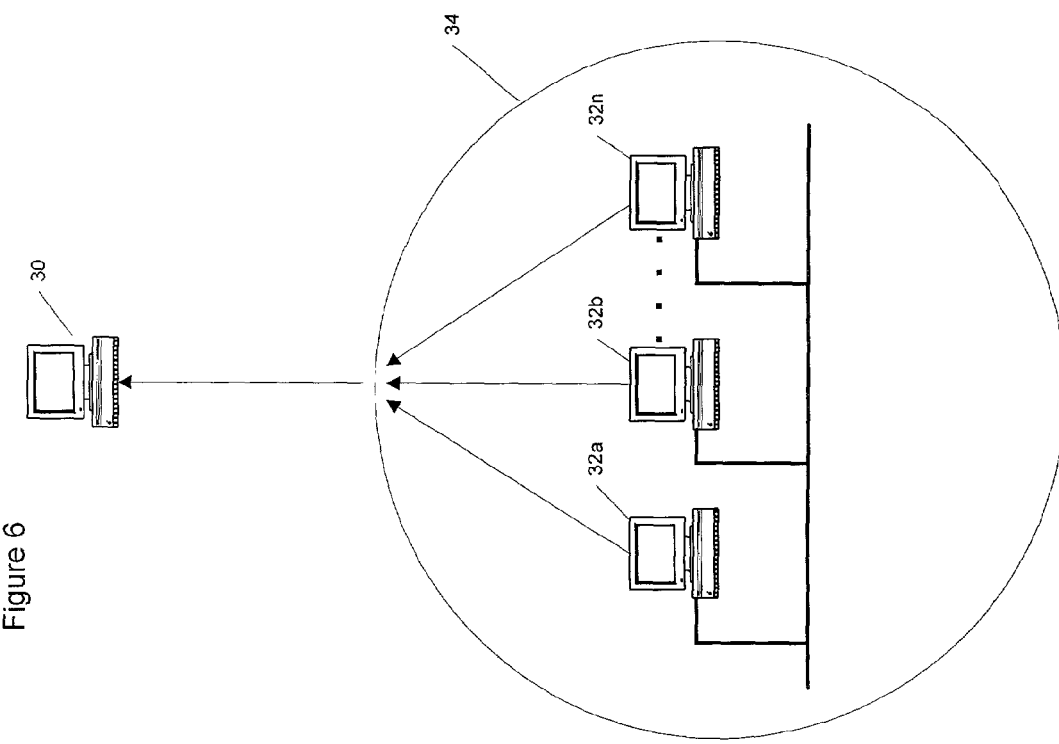
FIG. 5-11 are schematic representations of a network system including a subnet for describing various embodiments of the present disclosure.

In the embodiment shown in FIG. 5, DQS node 30 sends the query to all nodes (e.g., nodes 32a-32n) within subnet 34 using an IP directed broadcast (method (a)) or to one or more of the nodes using IP multicasting (method (b)). In response, each of the queried nodes will respond with an answer to the query as well as with information identifying the responding node. As shown in FIG. 6, the responses are routed back to DQS node 30 via, for example, an appropriate router (not shown), where a list of nodes on the subnet can be compiled.

Although shown in the figures as only sending the query to a single subnet, a DQS could, of course, query any number of subnets and/or other nodes not on a subnet. In addition, as mentioned above and as will be described in more detail later below, each responding node may calculate a response delay time so that each node responds to the query at a different time.

Figure 7:
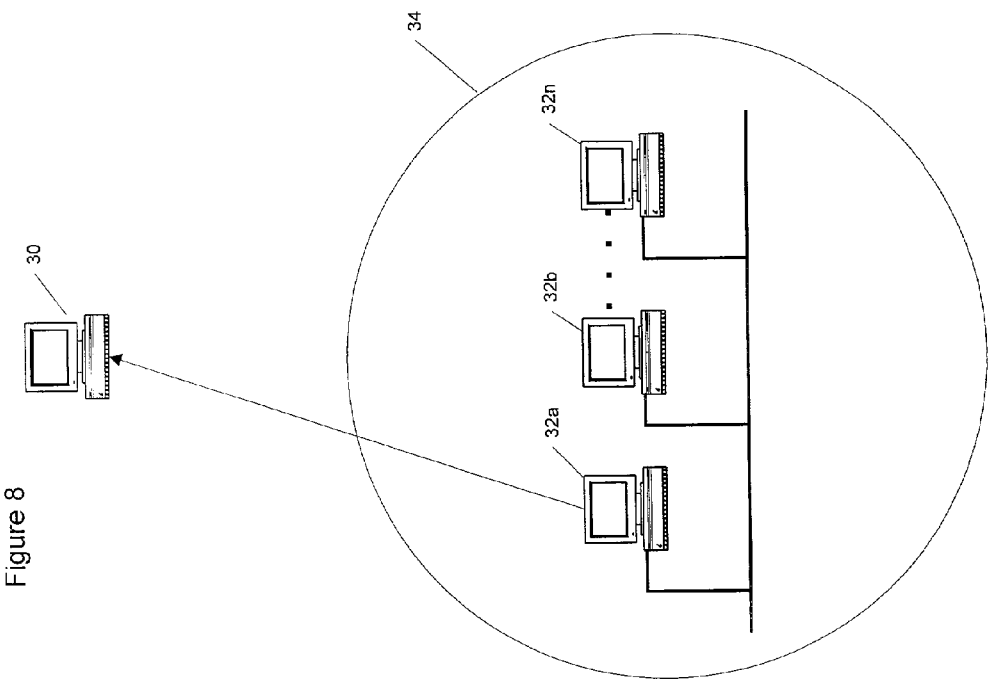

In another embodiment, DQS node 30 sends a query to nodes in subnet 34, as described above with respect to FIG. 5. However, in this embodiment, upon receipt of the query, each DQC node 32a-32n determines the answer to the question posed and presents the information to the other nodes in the subnet 34 via a local response, as shown in FIG. 7. That is, in this embodiment, responses generated by the DQC nodes are not sent directly back to the DQS node 30. Instead, local responses are sent to one or more other nodes on the subnet 34 using, for example, the same method that was used to send the query. As shown in FIG. 7, for example, nodes in the subnet may transmit a local response to the other nodes in the subnet using an IP directed broadcast. In the alternative, each node may transmit a local response to one or more specified addresses using an IP multicast, the specified address or addresses being either predefined or sent from DQS 30 along with the query. The local response may include an answer to the query and an identification of the responding node. The predefined node or nodes can then create a list of responding nodes. The predefined node may then transfer the list to the DQS node.

As described above, if each DQC node were to respond immediately to the query, a large amount of network traffic, called a packet storm, could be generated within the local subnet. To prevent this from happening, each DQC node does not respond immediately to the query. Instead, each DQC node can calculate a period of time (delay time) to wait before sending its Local Response.

In an IP based environment, the delay time may be calculated, for example, using one or more predetermined digits of the node's IP address and a multiplier called a delay constant.

For example, according to an embodiment, at least a portion of the DQC node's IP address and the delay constant can be multiplied and the resultant value used as a period of time to wait before the node sends its response to the query. The delay constant value may be sent by the DQS node along with the query, to allow the DQS node to tailor the delay to the environment.

Figure 12:
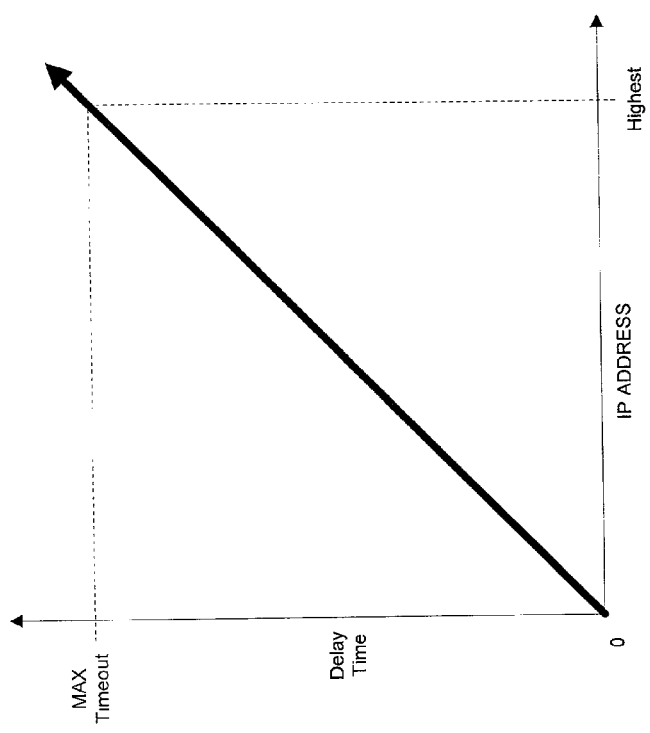
FIG. 12 is a graph of a relationship between a highest IP address amongst nodes in the subnet on the one axis and a delay time on the other axis, in accordance with an embodiment of the present disclosure.

Since each node has a unique IP address, each node will have a correspondingly unique delay time (e.g., see FIG. 12). For example, nodes with a lower numeric value for their IP address will have a shorter delay time. Thus, the node with the lowest address responds first and the node with the highest address responds last.

This method of calculating the delay allows each DQC node in the subnet to perform a number of functions. For example, since each DQC node will have access to the subnet mask, each DQC node can immediately determine if it has the lowest IP address in the subnet and thus can determine if it will be the first to respond. Instead of one or more predefined nodes receiving the responses and creating the list of responding nodes as described above, the node that determines that it is the first node to respond can create the list of responding nodes. In addition, each DQC node can calculate a query timeout period which represents the amount of time before the last node in the subnet will present its local response. That is, using the subnet mask, each DQC node can calculate the highest number IP address for the subnet and then using the delay constant, calculate how long it will take for the last node in the subnet to present its local response.

Figure 8:
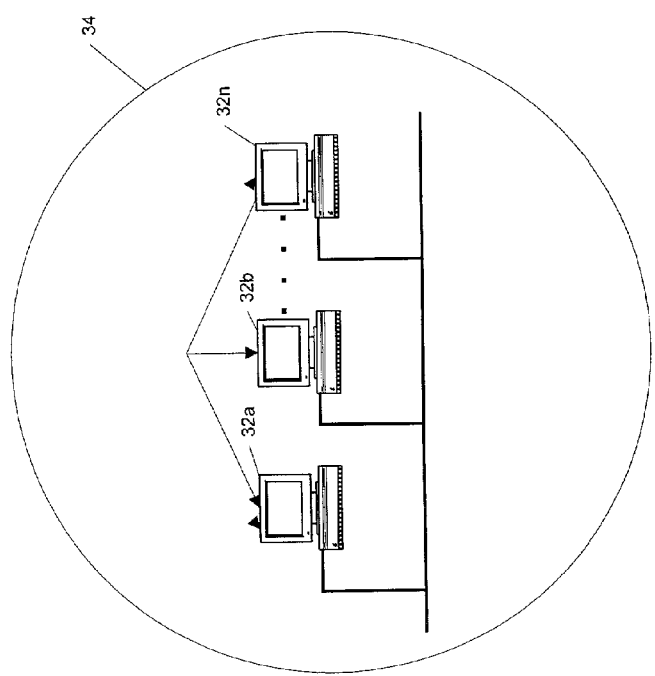

For example, returning to FIG. 7, assuming that node 32a has the lowest IP address, node 32a will determine that it will be the first DQC node to respond to the query. Node 32a will also determine the query timeout period, as described above, by determining the amount of time it will take for the last node to respond. Node 32a listens for and collects the local responses from the other DQC nodes (32b-32n) until the query timeout has been reached. Node 32a builds a list of the local responses generated by the other DQC nodes on the subnet. Node 32a transfers the information, which can include the answers to the query, as well as a list of machines that responded (including itself), back to DQS 30, as shown in FIG. 8.

Figure 13A:
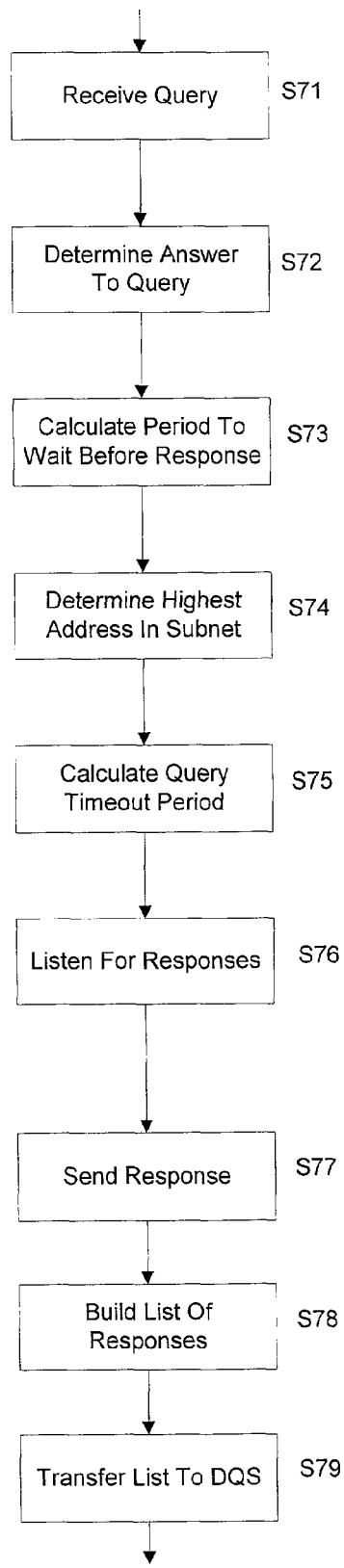
FIG. 13A is a flow chart of a method of identifying a plurality of nodes on a network, in accordance with an embodiment of the present disclosure.

The embodiment in which the DQS NODE sends information designating a node to create the list of responding nodes will now be further described by reference to FIG. 13A. Each DQC node (32a-32n) receives the query from DQS NODE 30 (Step S71). The query may include the subnet mask, a delay constant, and information identifying the node that is to create the list of responding nodes. Each node determines an answer to the query (Step S72) and calculates a period to wait before responding (Step S73), using its own IP address and the delay constant. The node designated to create the list of responding nodes determines the highest address in the subnet (Step S74) and calculates the query timeout period (Step S75) and listens for responses (Step S76) until the query timeout period has expired. Each node sends its response to the designated node (Step S77) using, for example, IP Multicasting. The designated node then builds the list of responding nodes (Step S78) and after the query timeout period has expired, transfers the list to the DQS node (Step S79).

Figure 13B:
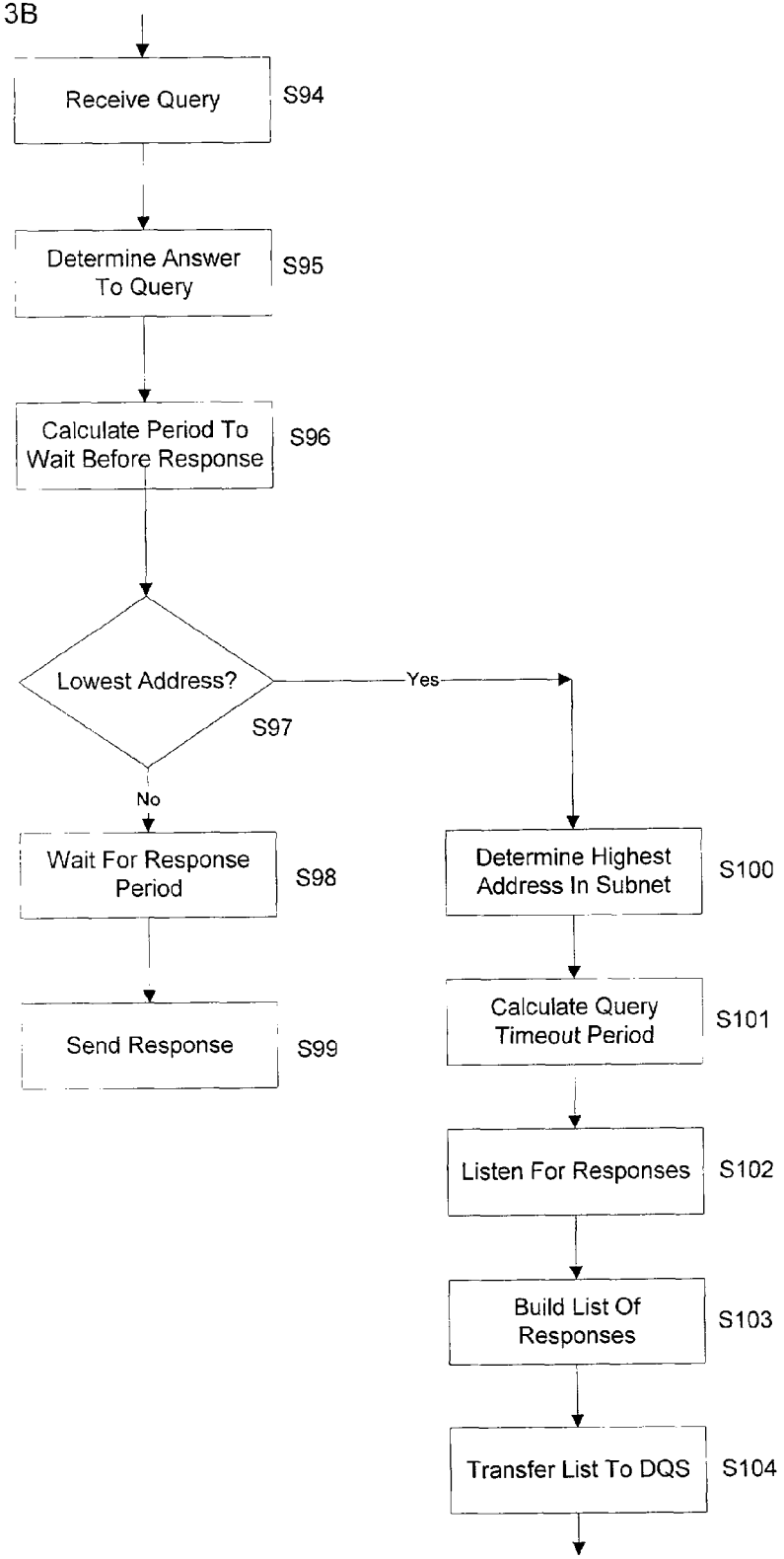
FIG. 13B is a flow chart of a method of identifying a plurality of nodes on a network, in accordance with another embodiment of the present disclosure.

The alternative embodiment in which the node with the lowest IP address creates the list of responding nodes will be described with respect to FIG. 13B. Each DQC node receives the query from the DQS node (Step S94) and determines an answer to the query (Step S95). Each node also calculates its respective delay period to wait before responding as described above (Step S96). Each node determines whether it has the lowest IP address in the subnet (Step S97). If a node does not have the lowest IP address (No, Step S97), the node will wait for its respective delay period determined in Step S96 (Step S98) and then send a response to the other nodes (Step S99) using, for example, an IP Directed Broadcast. If a node determines that it has the lowest IP address (Yes, Step S97), that node will determine the highest IP address in the subnet (Step S100) and calculate the query timeout period (Step S101). The node with the lowest IP address will then listen for responses from the other nodes (Step S102), build a list of responses (Step S103) and transfer the list to DQS 30 (Step S104).

In another embodiment, upon receipt of the query from the DQS, each DQC node may perform one or more of the following tasks: (i) identify itself to other nodes in the subnet; and (ii) build a list of nodes which have identified themselves in response to the query.

Task (i), e.g., identify itself, may be accomplished by each DQC node by sending a broadcast packet to the local subnet (referred to as, e.g., an "advertisement"). Upon receipt of the query, each DQC node may calculate an amount of time to wait (e.g., as described above) before sending the advertisement.

Task (ii), e.g., build a list of machines, may be accomplished by each DQC node by listening for the advertisements from other DQC nodes. Each DQC node in the subnet may create a list of nodes that have advertised themselves.

Since only one node needs to maintain the list, a rule may be defined which eliminates redundant lists being created. The rule may be, for example, if a node receives an advertisement from another node before it has advertised itself, the node does not build the list. Using this rule, the node which advertises first builds the list of nodes in the subnet. The node building the list in this embodiment is referred to herein as the "responder node".

The responder node calculates the query timeout period (e.g., described above) for the subnet and listens for advertisements from other machines for this period of time. After this amount of time has elapsed, the responder makes a connection (e.g., a TCP (Transmission Control Protocol) connection) to the DQS node which sent the query and transfers the list of nodes in the subnet to the DQS node.

Figure 14:
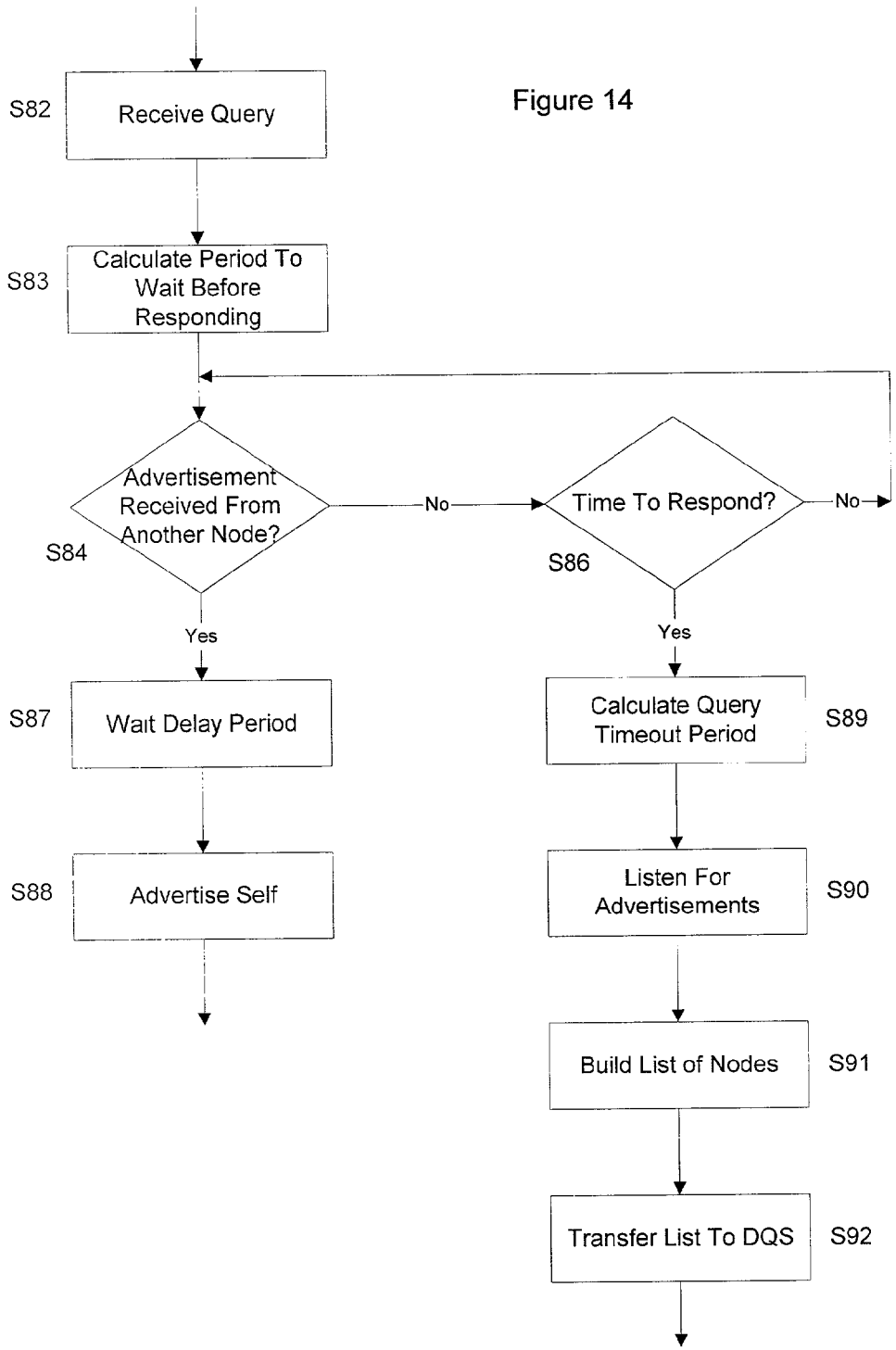
FIG. 14 is a flow chart of a method of identifying a plurality of nodes on a network, in accordance with yet another embodiment of the present disclosure.

For example, as shown in FIG. 14, each DQC node in the subnet receives the query (Step S82). Each node calculates a delay period to wait before responding to the query (Step S83). Each node performs a determination in Steps S84, S85, to determine whether it has received an advertisement before it has advertised itself. For example, if a node does not receive an advertisement from another node (No, Step S84), the node determines whether it is time for it to advertise itself (Step S86). If not time to advertise (No, Step S86), the node determines again whether it received an advertisement from another node (Step S84). If a node receives an advertisement prior to itself advertising (Yes, Step S84), the node waits its determined delay period (Step S87), and then identifies itself to other nodes (Step S88). If a node determines that it is time to advertise and it has not yet received an advertisement from another node (Yes, Step S86), the node calculates the timeout period as discussed above (Step S89), listens for advertisements (Step S90), builds a list of responding nodes (Step S91) and transfers the list to the DQC node.

In some instances, it may not be possible for a particular first DQS node to send an IP directed broadcast to the subnet. However, another second DQS node external to the subnet may have the capabilities of sending the IP directed broadcast to the subnet. In this case, the first DQS may send a query request to the second DQS node, requesting a query be sent to the subnet. The second DQS node then places the query using one of the methods described above, receives the information (e.g., the responses or the list) from the subnet and then transfers the information to the first DQS.

Figure 10:
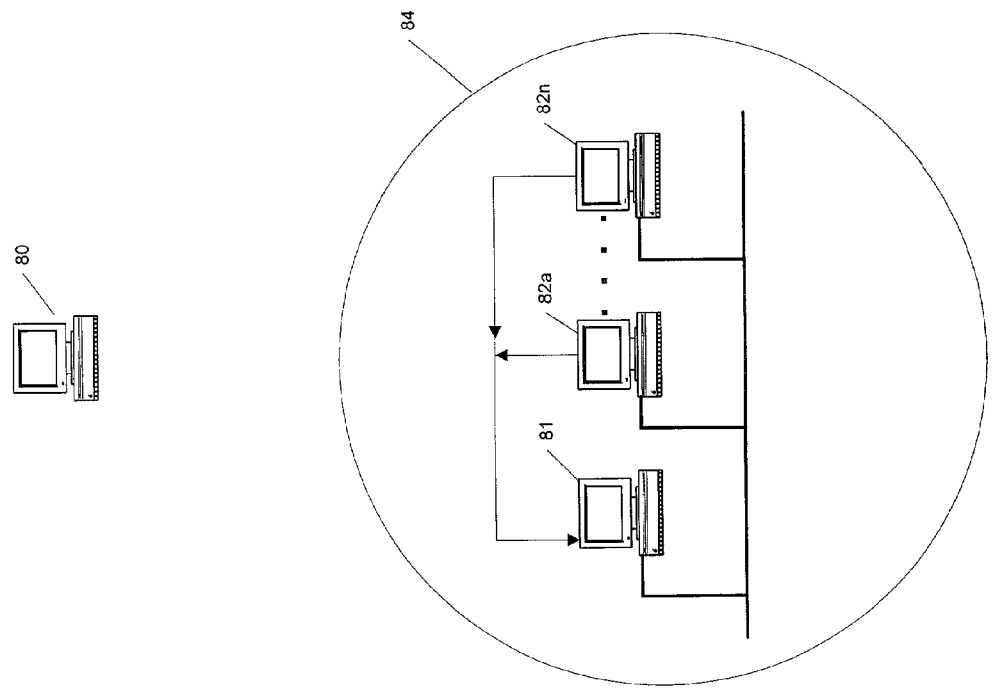
Figure 9:
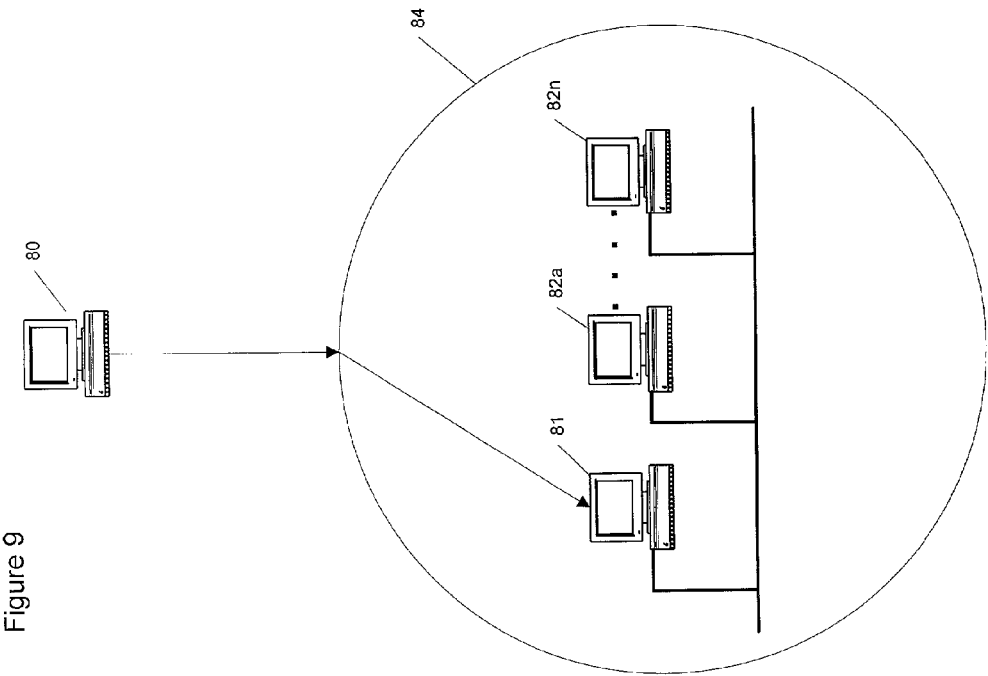
Figure 11:
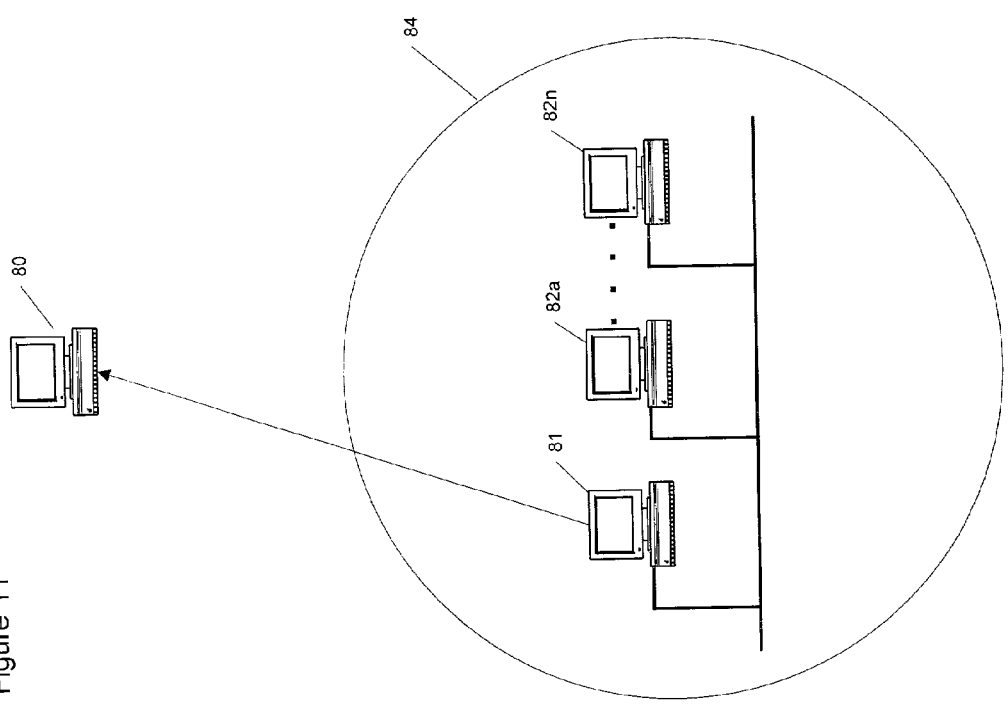

In some network configurations, it may not be possible for a DQS node outside of the subnet to send the query as an IP directed broadcast to the subnet. In this situation, using a known node running the DQC and DQS within the subnet (proxy node) the DQS node can specify the IP address of the proxy node in the subnet and send the query to the proxy node. For example, as shown in FIG. 9, DQS 80 can send the query request to node 81 within subnet 84. Node 81 is running the DQC and DQS and is thus capable of acting as a proxy node. Upon receipt of the query, proxy node 81 can then send the query to the other nodes on the subnet (e.g., DQC nodes 82a-82n) using, for example, an IP directed broadcast. Proxy node 81 then waits for and receives the responses from the other nodes (FIG. 10). Proxy node 81 can calculate a timeout period and compile a list of responding nodes as described above. Proxy node 81 then forwards the list to DCS node 80 as shown in FIG. 11.

The methods and systems of the present disclosure may be embodied in one or more computer programs stored on computer readable media and/or transmitted in one or more segments via, for example, a computer network, the Internet or other transmission medium, including wireless type systems.

While specific embodiments have been described above, the description is not meant to be construed in a limiting sense and it should be understood that the application is intended to cover adaptation to the embodiments described above. For example, under some circumstances, the server may specify as part of its query the IP address of the machine on the subnet which the server designates to build the list of machines and send the list back to the server. As another example, the last machine, instead of the first machine, that responds builds the list and sends it back to the server, with each machine building a list until it determines that it is not the last machine to respond, and then discarding its list (or retaining it for its own reference).

In the above embodiments, the query may be posed, for example, in response to a user request for information relating to the status of the network or subnet. In the alternative, the query may be automatically generated periodically so that information relating to the status of the network or subnet is available upon request.

The present disclosure may be conveniently implemented using one or more conventional general purpose digital computers and/or servers programmed according to the teachings of the present disclosure. Appropriate software coding can readily be prepared based on the teachings of the present disclosure.

Numerous additional modifications and variations of the present disclosure are possible in view of the above-teachings. It is therefore to be understood that within the scope of the appended claims, the present disclosure may be practiced other than as specifically described herein.

What is claimed is:

1. A method of identifying a plurality of nodes on a network, comprising:
   receiving a query sent from a caller node, wherein:
      the query comprises a delay constant; and
      the query is received by at least one of a plurality of nodes on a network;
   determining at the at least one node an answer to the query;
   calculating a delay period by at least multiplying the delay constant by at least a portion of a network address associated with the at least one node; and after the delay period, forwarding the answer to the query from the at least one node to the caller node, wherein the caller node is operable to maintain a list of nodes which responded to the query.

2. A method as recited in claim 1, further comprising:
calculating a timeout period based at least in part on a network address; and
after the timeout period, identifying a plurality of nodes which responded to the query.

3. A method as recited in claim 1, wherein each of the plurality of nodes on the network forwards to the caller node an answer to the query at different times.

4. A method as recited in claim 1, wherein each of the plurality of nodes on the network calculates a respective delay period by at least multiplying the delay constant by at least a portion of its own network address.

5. A method as recited in claim 1, wherein each of the plurality of nodes on the network are on a subnet, the query sent from the caller node comprising a subnet mask.

6. The method of claim 1, wherein the caller node includes the delay constant in the query to customize response times from the plurality of nodes based at least in part on projected network traffic.

7. A method of identifying nodes on a network, comprising:
sending a query from a caller node to a subnet, the query comprising a delay constant;
receiving the query at a plurality of nodes on the subnet;
calculating a delay period by at least multiplying the delay constant by at least a potion of a network address associated with at least one of the plurality of nodes;
after the delay period, sending a local response to the query from the at least one node to at least one other node on the subnet;
receiving, at one of the plurality of nodes on the subnet, the local response and compiling a list identifying responding nodes; and
sending the list of responding nodes to the caller node.

8. A method as recited in claim 7, wherein each of the plurality of nodes on the subnet sends its local response at different times.

9. A method as recited in claim 8, wherein each of the plurality of nodes on the subnet calculates a respective delay period to wait prior to sending its local response.

10. A method as recited in claim 8, wherein the one of the plurality of nodes on the subnet compiling the list identifying the responding nodes is a node first to respond with a local response to the query.

11. A method as recited in claim 10, wherein the node compiling the list identifying the responding nodes calculates a timeout period indicating when a last of the plurality of nodes will send its local response and receives the local responses until the timeout period has expired.

12. A method as recited in claim 11, wherein the timeout period is calculated by the node compiling the list identifying the responding nodes by multiplying, by the delay constant, at least a portion of an address of a node having a highest IP address on the subnet.

13. A method as recited in claim 12, wherein the query further comprises a subnet mask.

14. A method as recited in claim 7, wherein the query from the caller node comprises information identifying which of the plurality of nodes on the subnet is to compile the list of responding nodes.

15. A method as recited in claim 14, wherein each of the responding nodes sends its local response to the node identified in the query.

16. The method of claim 7, wherein the caller node includes the delay constant in the query to customize response times from the plurality of nodes based at least in part on projected network traffic.

17. A method of controlling a node in a network, comprising:
receiving at the node a query from a caller node, the query comprising a delay constant;
determining an answer to the query;
calculating a delay period to wait before responding to the query, the delay period calculated by at least multiplying the delay constant by at least a portion of a network address associated with the node;
determining whether the node has a lowest address in the network;
if the node does not have the lowest address in the network, waiting the period of time and then responding to the query;
if the node does have the lowest address in the network, determining an address of a node having a highest address in the network;
determining, based at least in part on the highest address in the network, a query timeout period;
if the node does have the lowest address in the network, listening for responses to the query from other nodes in the network and preparing a list of responding nodes; and
transferring the list of responding nodes to the caller node.

18. A method as recited in claim 17, wherein the query from the caller node comprises a subnet mask, the node determining whether it has the lowest address in a subnet by referring to the subnet mask.

19. A method as recited in claim 18, wherein the address of the node having the highest address in the subnet is determined by referring to the subnet mask.

20. A method as recited in claim 19, wherein a query timeout period is calculated by the node by multiplying at least a portion of the highest address in the subnet by the delay constant.

21. A method of identifying a plurality of nodes on a network, comprising:
receiving a query sent from a caller node, wherein:
the query comprises a delay constant; and
the query is received by at least one of a plurality of nodes on a network;
calculating a delay period by at least multiplying the delay constant by at least a portion of a network address associated with the at least one node;
after the delay period, transmitting an answer to the query from the at least one node; and
monitoring, at a responder node which received the query, responses from other nodes to the query and maintaining a list of nodes which responded to the query.

22. The method of claim 21, wherein each node which received the query waits a respective delay period unique to the node before responding to the query.

23. The method of claim 21 further comprising transmitting from the responder node to the caller node after a query timeout period the list of nodes which responded to the query.

24. The method of claim 23, wherein the responder node is the first node to respond to the query.

25. The method of claim 23, wherein a selected one of the plurality of nodes is designated within the query to maintain and transmit to the caller node the list of nodes which responded to the query.

26. A network, comprising:
   a server for posing a query to a plurality of client nodes on the network, the server comprising a computer and the query comprising a delay constant; and
   a plurality of client nodes for receiving the query posed by a caller node and for determining an answer to the query, each of the plurality of client nodes forwarding, after a respective delay period calculated by at least multiplying the delay constant by at least a portion of a network address, the answer to the query to the caller node, wherein:
      the server receives the answers to the query from the plurality of client nodes; and
      the server maintains a list of client nodes which responded to the query.

27. A network as recited in claim 26, wherein each of the plurality of client nodes calculates a respective delay period to wait before forwarding its respective answer to the query to the server.

28. A network as recited in claim 27, wherein each of the plurality of client nodes on the network forwards the answer to the query to the server at different times.

29. A network as recited in claim 27, wherein each of the plurality of client nodes on the network calculates a respective delay period to wait before forwarding its respective answer to the query by at least multiplying the delay constant by at least a portion of its own network address.

30. A network as recited in claim 26, wherein each of the plurality of client nodes on the network are on a subnet, the query posed by the caller node comprising a subnet mask.

31. A system for identifying nodes on a network, comprising:
   a server for sending a query to a subnet, wherein the query comprises a delay constant and the server is a computer;
   a plurality of client nodes on the subnet for receiving the query from the server, wherein, after a delay period calculated by at least multiplying the delay constant by at least a portion of a network address, at least one client node on the subnet sends a local response to the query to at least one other client node on the subnet, the at least one other client node on the subnet compiling a list identifying responding nodes, the at least one other client node sending the list identifying the responding nodes to the server.

32. A system as recited in claim 31, wherein each of the plurality of client nodes on the subnet sends its local response at different times.

33. A system as recited in claim 32, wherein each of the plurality of client nodes on the network calculates a respective delay period to wait prior to sending its local response.

34. A system as recited in claim 32, wherein the at least one other client node on the subnet compiling the list identifying the responding nodes is a node first to respond with a local response to the query.

35. A system as recited in claim 34, wherein the node compiling the list identifying the responding client nodes calculates a timeout period indicating when a last of the plurality of client nodes will send its local response and receives the local responses until the timeout period has expired.

36. A system as recited in claim 34, wherein the timeout period is calculated by the node compiling the list identifying the responding client nodes by at least multiplying the delay constant by at least a portion of an address of a node having a highest IP address on the subnet.

37. A system as recited in claim 36, wherein the query further comprises a subnet mask.

38. A system as recited in claim 31, wherein the query from the server comprises information identifying which of the plurality of client nodes on the subnet is to compile the list of responding nodes.

39. A system as recited in claim 38, wherein each of the responding client nodes sends its local response to the client node identified in the query.

40. A node for use on a subnet, comprising:
   a section for receiving a query from a caller node, the query comprising a delay constant;
   a section for determining an answer to the query;
   a section for calculating a delay period to wait before responding to the query, the delay period calculated by at least multiplying the delay constant by at least a portion of a network address;
   a section for determining whether the node has a lowest address in the network, the node comprising a machine in the network, wherein:
      if the node does not have the lowest address in the network, the node responds to the query after the delay period;
      if the node does have the lowest address in the network, a section of the node determines an address of a node having a highest address in the network and based at least in part on the highest address in the network, determines a query timeout period; and
      if the node does have the lowest address in the network, a section listens for responses to the query from other nodes in the network and prepares a list of responding nodes; and
   a section for transferring the list of responding nodes to the caller node.

41. A node as recited in claim 40, wherein the node determines the period to wait before responding by at least multiplying at least a portion of its network address by the delay constant.

42. A node as recited in claim 40, wherein the query from the caller node comprises a subnet mask, the node determining whether it has the lowest address in a subnet by referring to the subnet mask.

43. A node as recited in claim 42, wherein the address of the node having the highest address in the subnet is determined by referring to the subnet mask.

44. A node as recited in claim 43, wherein a query timeout period is calculated by the node by at least multiplying at least a portion of the highest address in the subnet by the delay constant.

45. A computer readable medium having computer executable code for identifying nodes on a network, comprising:
   server code for posing a query to a plurality of client nodes on the network, the query comprising a delay constant; and
   client code for use by a plurality of client nodes for receiving the query posed by a caller node and for determining an answer to the query, the client code comprising code instructing at least one of the plurality of client nodes to forward, after a delay period calculated by at least multiplying the delay constant by at least a portion of a network address, the answer to the query to the caller node, wherein a node running the server code maintains a list of client nodes which responded to the query.

46. A computer readable medium having computer executable code for identifying nodes on a network, comprising:
   server code for use by a server for sending a query to a subnet, the query comprising a delay constant;

client code for use by a plurality of client nodes on the subnet for receiving the query from the server, wherein in response to the query, the client code for at least one of the plurality of client nodes on the subnet sends, after a delay period calculated by at least multiplying the delay constant by at least a portion of a network address, a local response to the query to at least one other client node on the subnet, the client code of the at least one other client node on the subnet compiling a list identifying responding nodes and sending the list identifying the responding nodes to the server.

47. A computer readable medium comprising computer executable code to be executed by a node on a subnet, comprising:
- code for receiving a query from a caller node, the query comprising a delay constant;
- code for determining an answer to the query;
- code for calculating a delay period to wait before responding to the query, the delay period calculated by at least multiplying the delay constant by at least a portion of a network address;
- code for determining whether the node has a lowest address in the network, wherein:
    - if the node does not have the lowest address in the network, the code directs the node to respond to the query after the delay period;
    - if the node does have the lowest address in the network, the code directs the node to determine an address of a node having a highest address in the network and, based at least in part on the highest address in the network, determine a query timeout period; and
    - if the node does have the lowest address in the network, the code directs the node to listen for responses to the query from other nodes in the network and to prepare a list of responding nodes; and
- code for transferring the list of responding nodes to the caller node.

48. A program storage device readable by a machine, tangibly embodying a program of instructions executable by the machine to identify a plurality of nodes on a network, comprising:
- instructions to receive a query posed by a caller node, wherein:
    - the query comprises a delay constant; and
    - the query is received by at least one of the plurality of nodes on the network;
- instructions to calculate a delay period by at least multiplying the delay constant by at least a portion of a network address associated with the at least one of the plurality of nodes;
- instructions to transmit, after the delay period, an answer to the query from the at least one of the plurality of nodes; and
- instructions to monitor, at a responder node which received the query, responses from other nodes to the query and to maintain a list of nodes which responded to the query.

49. A network device comprising:
- a receiving query section for receiving a query sent by a caller node to a plurality of nodes on a network, the query comprising a delay constant;
- a delay calculating section for calculating a delay period by at least multiplying the delay constant by at least a portion of a network address, the delay period usable to determine when to transmit a response to the query; and
- a list processing section for monitoring responses from other nodes to the query and maintaining a list of nodes which responded to the query.

50. A network of nodes comprising:
- a caller node for sending a Distributed Query to a plurality of nodes, the caller node comprising a machine in a network, the Distributed Query comprising a delay constant; and
- at least one responder node comprising:
    - a receiving query section for receiving the Distributed Query sent by the caller node;
    - a delay calculating section for calculating a delay period by at least multiplying the delay constant by at least a portion of a network address, the delay period usable to determine when to transmit a response to the query; and
    - a list processing section for monitoring responses from other nodes to the Distributed query and maintaining a list of nodes which responded to the Distributed Query.

* * * * *